June 29, 1965        E. EISNER        3,191,488
SPECTROGRAPH UTILIZING ANAMORPHIC LENS SYSTEM
Filed June 28, 1962
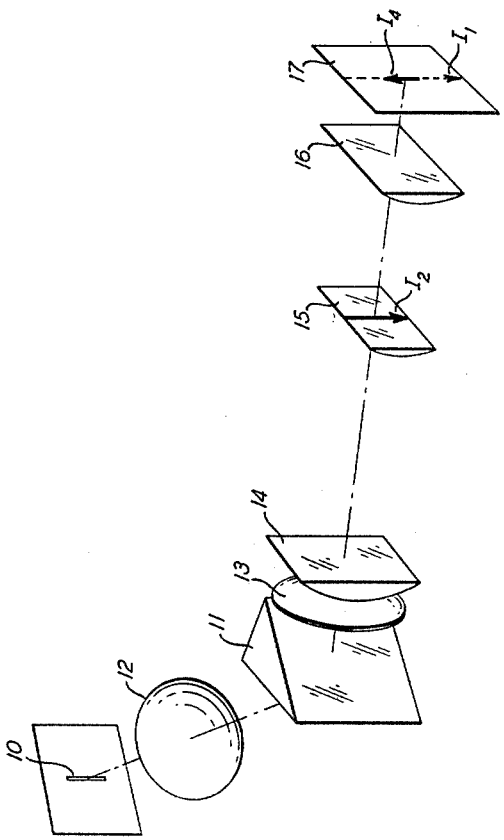
INVENTOR
E. EISNER
BY
ATTORNEY

3,191,488
SPECTROGRAPH UTILIZING ANAMORPHIC LENS SYSTEM
Edward Eisner, Bernardsville, N.J., assignor to Bell Telephone Laboratories, Incorporated, New York, N.Y., a corporation of New York
Filed June 28, 1962, Ser. No. 205,907
3 Claims. (Cl. 88—14)

This invention relates to an improved spectrograph in which the intensity of the spectral line of interest is favorably altered without loss of stigmatism.

The construction of a typical spectrograph serves to separate the wavelengths of a light source by a disperser, usually a prism or diffraction grating, and to collect and focus the separated components onto a photographic plate or visual analyzer. The spectral lines which result are of interest only as to their separation and intensity. The height of the lines is of little consequence.

It is readily apparent that a "spherical" lens system in combination with the disperser projects an image magnified equally in the direction both parallel to and perpendicular to the direction of dispersion. Since the horizontal or width projection of the spectral array is of primary interest, much of the light creating the height dimension is not useful in terms of the line intensity. Accordingly, various mechanisms have been proposed for reducing the height of the spectrum thereby intensifying the spectral lines. Such methods alternatively allow the spectrum to be broadened with no loss in intensity.

The commonly suggested expedient for achieving this is to employ a cylindrical lens in the system for focusing the spectrum onto the observation plane. This serves to reduce the height of the spectrum while leaving the width unchanged. However, the cylindrical lens changes the focal plane for the components of rays that lie in planes normal to the cylindrical axis, while leaving unaltered the components in planes parallel to both the cylindrical axis and the axis of the instrument. This means that no surface of true stigmatic focus exists.

The present invention achieves the reduction in height of the spectrum with the attendant gain in line intensity while preserving the stigmatism of the image. This is obtained by the use of an anamorphic lens system. For the purpose of this invention such a system is defined (in terms of spectrograph construction) as an imaging system which has a shorter effective focal length, and a larger relative aperture in a plane parallel to the slit than in a plane containing the direction of dispersion.

Anamorphic lens systems may assume a number of forms, i.e., lens, prism, and mirror combinations. The most general form, and that envisioned as most useful in the present application, requires an array of cylindrical lenses, at least two, and conveniently three. One cylindrical lens serves to reduce the height of the spectral image formed by the components in a plane normal to the cylindrical axis of the image-forming rays from a "spherical" imaging system. A second cylindrical lens (with its cylindrical axis parallel to that of the first) takes these same ray components and forms a spectral image with them in the same plane as that in which the unaffected components form their spectral image. Thus, all components of rays from the "spherical" imaging system form an image in this plane, which is therefore a plane of true, stigmatic focus. A third cylindrical lens, while not essential, can reduce the size required in the second lens if suitably placed between the other two.

This arrangement may be more thoroughly appreciated from a consideration of the drawing in which:

The figure is a perspective view of a lens system appropriate for achieving the desired ends of the invention.

The figure shows a vertical spectrograph slit 10 through which the subject light emerges. The light is directed into prism 11 by a collimator lens system represented by the spherical lens 12. Emerging rays from prism 11 are collected by spherical lens 13. In the absence of the cylindrical lenses there would appear, in the second principal focal surface 17 of lens 13, bands of light separated according to wavelength. The light of any one wavelength would form a true, stigmatic image, $I_1$, of the slit 10. The anamorphic lens system replaces the spherical lens and serves to reduce the height of the spectral image with a proportionate increase in brightness. In this embodiment the anamorphic system is made by adding to the spherical lens 13, the cylindrical lenses 14, 15 and 16. The lens 14, placed near lens 13, converges the spectrum in the vertical dimension only, while the remaining dimension is unaffected. Thus, for any one wavelength, a virtual image, $I_2$, of the slit is formed. This virtual image consists of a set of true images of the slit, set side by side, each image being produced by light from one vertical strip element of the lens 13. The light of different wavelengths produces virtual images in planes close to each other. The relay lens 16, properly placed, recovers the stigmatism by focusing the virtual images on the observation surface 17. Each wavelength forms a true, stigmatic image, such as $I_4$, of the slit, on this surface. The ratio of the heights of $I_1$ to that of $I_4$ is termed the "magnification ratio." If the dimensions of the lenses are properly chosen, and if the system is loss free, then the magnification ratio is also the ratio of the intensity of $I_4$ to that of $I_1$, that is, it is the "intensification ratio" produced by the anamorphic system. The intermediate cylindrical field lens 15, which should be placed approximately at the virtual images, $I_2$, serves merely to reduce the size requirements of lens 16 by forming a virtual image of lens 13 on lens 16.

Consider now a typical specification of lens requirements for this particular system. Assume a magnification ratio of 4. This approximates the line intensity increase. For the system of the figure this value is also the ratio of the relative aperture of the lens 14 to the numerical aperture of spherical lens 13, providing the system is properly designed such that substantially the entire aperture of each lens is utilized (such that no useful light misses a lens through which it should pass). Thus, given a spherical lens 13 with a numerical aperture (ratio of diameter to focal length) of 1/4, the effective relative aperture (ratio of height to image distance) required of cylindrical lens 17 is 1. An exemplary geometry of the system is:

| Dimension: | Relative units of length |
|---|---|
| Focal length of spherical lens | 48 |
| Diameter of spherical lens | 12 |
| Vertical dimension of cylindrical lens 14 | 12 |
| Vertical dimension of cylindrical lens 15 | 6 |
| Vertical dimension of cylindrical lens 16 | 8 |
| Spacing between lenses 14 and 15 | 24 |
| Spacing between lens 16 and observation plane 17 | 8 |
| Vertical dimension of image $I_1$ | 12 |
| Height of virtual image $I_2$ in plane of lens 15 | 6 |
| Height of final image $I_4$ in observation plane 17 | 3 |

It is seen that the original image of the slit was vertically reduced 4 to 1 in the final observation plane with an attendant intensification of 4×. The ultimate image from this lens system is completely stigmatic. These results will be achieved, more or less, in degree, with any true anamorphic lens system. Optical systems with relative apertures significantly greater than one are difficult and expensive to design. However, by combining an anamorphic lens with a vertical relative aperture of one, in a device using a spherical collecting lens having a numerical aperture of 1/20, a 20× intensification can be obtained. Magnifications of 1.5× are considered minimal for the purposes of this invention.

Whereas this invention has been described in terms of the use of an anamorphic lens systems in place of the usual telescope, i.e., the element used for focusing the spectrum emitted from the disperser, it is also effective when used as the collimator, that is, as the element for directing the light from the slit into the disperser. In fact, it will be obvious to one skilled in the art that, if anamorphic systems are used on both sides of the disperser, the height and intensification of the image may be controlled separately without loss of stigmatism. In particular, intensification may be achieved without sacrifice of spectrum height. Another obvious variation of these principles is the use of mirrored surfaces or prisms in place of the lenses described. Such a modification is straightforward and is considered as a form of this invention. Thus, the terminology lens or lenses used in the appended claims is to include mirrored surfaces or prisms employed to achieve the same result.

Various other modifications and extensions of this invention will become apparent to those skilled in the art. All such variations and deviations which basically rely on the teachings through which this invention has advanced the art are properly considered within the spirit and scope of this invention.

What is claimed is:

1. A spectrograph comprising a light source consisting of a vertical slit, disperser means for selectively dispersing the light from the light source according to wavelength, a first spherical lens spaced from the source so as to direct an essentially parallel beam of light into the disperser, a second spherical lens for focusing the dispersed light onto the image plane and at least two cylindrical lenses which with the spherical lenses comprise an anamorphic lens system, said cylindrical lenses each placed between said second spherical lens and the image plane with their longitudinal geometric axes normal to the vertical axis of said slit to reduce the height of the image from the slit and focus the vertical light components onto the image plane without affecting the horizontal components.

2. The spectrograph of claim 1 including three cylindrical lenses.

3. The spectrograph of claim 1 further including at least two cylindrical lenses between the slit and the said first spherical lens with their axes normal to the slit and spaced apart to form a stigmatic image of the slit of increased size onto the image plane.

References Cited by the Examiner
UNITED STATES PATENTS 2,764,065   9/56   Buchele _____ 88—57

OTHER REFERENCES

Green et al.: An Auxiliary Lens for Use With the Concave Grating, Journal of the Optical Society of America, vol. 34, No. 12, December 1934, pages 348–350.

Oldenberg: Illumination in Spectrographs, Journal of the Optical Society of America, vol. 22, No. 8, August 1932, pages 441–455.

FREDERICK M. STRADER, *Primary Examiner.*

JEWELL H. PEDERSEN, *Examiner.*